US008596306B2

(12) United States Patent
Shaffer et al.

(10) Patent No.: US 8,596,306 B2
(45) Date of Patent: Dec. 3, 2013

(54) PERFLUOROCARBON GAS INSUFFLATION

(75) Inventors: Thomas H. Shaffer, Chadds Ford, PA (US); Robert G. Stern, Tucson, AZ (US); Marla R. Wolfson, Wyndmoor, PA (US)

(73) Assignee: Synthetic Gas Solutions, LLC DE (US)

( * ) Notice: Subject to any disclaimer, the term of this patent is extended or adjusted under 35 U.S.C. 154(b) by 855 days.

(21) Appl. No.: 12/613,625

(22) Filed: Nov. 6, 2009

(65) Prior Publication Data

US 2010/0084066 A1 Apr. 8, 2010

Related U.S. Application Data

(63) Continuation-in-part of application No. 11/277,428, filed on Mar. 24, 2006, now abandoned.

(60) Provisional application No. 60/596,878, filed on Oct. 27, 2005.

(51) Int. Cl.
*B65B 1/04* (2006.01)
*B01F 13/10* (2006.01)

(52) U.S. Cl.
CPC .................. *B01F 13/1055* (2013.01)
USPC .................. 141/9; 141/38; 152/415

(58) Field of Classification Search
USPC ................ 141/9, 38, 100, 105, 114; 152/415; 473/594; 606/20
See application file for complete search history.

(56) References Cited

U.S. PATENT DOCUMENTS

| | | | | |
|---|---|---|---|---|
| 3,047,040 A * | 7/1962 | Gross | ............................. | 152/450 |
| 4,098,504 A * | 7/1978 | Koziol et al. | .................. | 473/609 |
| 4,300,767 A * | 11/1981 | Reed et al. | ..................... | 473/594 |
| 4,358,111 A * | 11/1982 | Papinsick et al. | ............. | 473/609 |
| 4,513,803 A | 4/1985 | Reese | | |
| 4,646,884 A * | 3/1987 | Yang | ........................ | 188/322.21 |
| 5,124,395 A | 6/1992 | Abramowski et al. | | |
| 5,502,076 A | 3/1996 | Dixit et al. | | |
| 5,618,912 A | 4/1997 | Fang | | |
| 5,648,406 A | 7/1997 | Peelor et al. | | |
| 5,705,604 A | 1/1998 | Fang | | |
| 5,765,601 A | 6/1998 | Wells et al. | | |
| 5,977,196 A | 11/1999 | Wicks | | |
| 6,063,837 A | 5/2000 | Kawamura et al. | | |
| 6,155,313 A * | 12/2000 | Smalley | ........................... | 141/38 |
| 6,344,499 B1 | 2/2002 | Kawamura et al. | | |
| 6,454,892 B1 | 9/2002 | Gerresheim et al. | | |
| 6,492,436 B2 | 12/2002 | Howe et al. | | |
| 6,510,875 B2 * | 1/2003 | Fang et al. | ......................... | 141/4 |
| 6,605,654 B1 | 8/2003 | Fang et al. | | |
| 6,612,346 B1 * | 9/2003 | Allen et al. | ...................... | 141/38 |
| 6,780,904 B2 | 8/2004 | Dudley et al. | | |
| 6,889,723 B2 | 5/2005 | Gerresheim et al. | | |
| 7,137,417 B2 * | 11/2006 | Kroll et al. | ....................... | 141/66 |
| 7,174,925 B2 * | 2/2007 | Fritz, II | ............................ | 141/38 |

(Continued)

OTHER PUBLICATIONS

System Fills Tires with Safe, Long-Lasting Nitrogen to Extend Tire Life/Increase Fuel Mileage/Provide Better Road Handling by Air Products. http://www.airproducts.com/PressRoom/CompanyNews/Archived/19 . . . , Sep. 3, 1996.

*Primary Examiner* — Timothy L Maust
(74) *Attorney, Agent, or Firm* — Paul & Paul

(57) ABSTRACT

Vehicle tires are filled with perfluorocarbon gas to extend tire life.

11 Claims, 2 Drawing Sheets

(56) References Cited

U.S. PATENT DOCUMENTS

| | | | |
|---|---|---|---|
| 7,370,677 B2 * | 5/2008 | Seghezzi | 141/9 |
| 7,611,429 B2 * | 11/2009 | O'Neill et al. | 473/604 |
| 2002/0049260 A1 | 4/2002 | Howe et al. | |
| 2005/0096469 A1 | 5/2005 | Henderson et al. | |

* cited by examiner

PERFLUOROCARBON GAS INSUFFLATION

CROSS-REFERENCE TO RELATED APPLICATIONS

The present application is a continuation-in-part of copending U.S. patent application Ser. No. 11/277,428, filed Mar. 24, 2006, which claimed the priority benefit of U.S. Provisional Patent Application Ser. No. 60/596,878 filed Oct. 27, 2005.

BACKGROUND OF THE INVENTION

1. Field of the Invention

The present invention relates to operating fluids for pneumatic and hydraulic devices and inflatable articles such as vehicle tires.

2. Brief Description of the Prior Art

Inflatable vehicle tires are a critical component of transportation in the modern economy. Invented in the United Kingdom in the late 19th Century, inflatable pneumatic tires are conventionally filled with compressed air, although other gases have been used in special circumstances. Similarly, commercial and industrial equipment typically use compressed air as an operating fluid due to its low cost.

Correct inflation is highly significant when considering tire life, safety, and performance. It is not always possible to look at a tire and detect under-inflation. However, under-inflation can cause many tire-related problems. As inflation pressure largely determines a tire's load capacity, under-inflation results in an overloaded tire. An under-inflated tire operates at high deflection resulting in decreased fuel economy, sluggish handling and may result in excessive mechanical flexing and heat build up leading to catastrophic tire failure.

More recently, nitrogen, a dry, inert gas has been used to inflate airplane tires, off-road truck tires, military vehicle tires, and race car tires for improved performance. The rationale for the use of nitrogen is related to the fact that oxygen in compressed air permeates through the wall of the tire, thus reducing the tire's inflation pressure. During this process and its journey through the tire wall, oxygen oxidizes the rubber compounds in the tire, causing under-inflation and deterioration of the rubber. In addition, the deterioration of the rubber further increases the tire and liner permeability, as well as, intracarcass pressure, thus resulting in further damage and under-inflation of the tire. Dry nitrogen can maintain proper inflation pressure and prevent auto-ignition, will not corrode rims, and will help the tire to run cooler. The result is increased safety and reduced operating cost.

Portable tire sealing and inflation devices are well known for emergency use by motorists to temporarily seal and inflate punctured vehicles tires. Typical compositions for use in such devices include a sealant and a pressurized gas to blow the sealant into the punctured tire and to inflate the tire. The pressurized gas can be generated in situ from a suitable compound and an activating material, or prepackaged with the sealant. Examples of gases that have been used or considered for use in tire sealing and other tire inflation devices include various hydrocarbons and chlorofluorocarbons, carbon dioxide, nitrous oxide, nitrogen and air.

However, various disadvantages have been disclosed in respect to many of these gases. For example, use of carbon dioxide, nitrous oxide, nitrogen and air is not practical, because the U.S. Department of Transportation has set a limit of 180 psig at 130 degrees F. for interstate shipping of products in pressurized aerosol cans. Under these conditions many materials that remain gases at room temperature under elevated pressure require too large a volume at the 180 psig pressure limit to be practical.

Even materials that condense under pressure, and thus, in the liquid phase, require much smaller volumes, may have significant disadvantages, such a flammability (hydrocarbons) or ozone-depleting qualities (chlorofluorocarbons with high ozone depletion potentials, such as "Freon 11," trichlorofluoromethane, and "Freon 12," dichlorodifluoromethane). Other materials may not be suitable as a tire inflatant for other reasons. For example, U.S. Pat. No. 6,605,654 discloses that 1,1,2,2-tetrafluorethane (HFC-134a) has a very high vapor pressure at 130 degrees F. (199.2 psig) such that vapor pressure depressants such as butyl cellosolve, acetone, methyl ethyl ketone, or acetonitrile must be mixed with 1,1,2,2-tetrfluoroethane when it is employed as a propellant.

Another consideration is the rate of diffusion of the inflatant material in the tire rubber. The greater the rate of diffusion through tire rubber, the faster the loss of the target inflation pressure, the more frequently tires must be reinflated. Compared with air, nitrogen has a lower rate of diffusion in tire rubber, and has been promoted as a desirable substitute. Filling tires with nitrogen can reduce the extent of underinflation. Tire underinflation is associated with shortened tire life, reduced fuel mileage, and poorer road handling.

There is a continuing need to reduce vehicle fuel consumption, reduce tire underinflation, extend tire life, and improve motor vehicle safety.

SUMMARY OF THE INVENTION

The present invention provides for the use of inert perfluorocarbon gas in combination with other gases to optimize either economy or performance of inflating and operating pneumatic devices and equipment. Specific embodiments relate to tires, pneumatic equipment, and devices that require operating gases greater than atmospheric pressure. The perfluorocarbon gas' larger molecules and anti-oxidative properties reduce the rate at which the working fluid is lost from tires, equipment, or devices in comparison with air or other gases commonly used gases, such as carbon dioxide or nitrogen, while retarding deterioration of the inflated component due to oxidation.

The present invention provides inflatable articles, such as vehicle tires, inflated with an inflation fluid comprising at least one perfluorocarbon compound. Preferably, in one aspect of the present invention, the total amount of the perfluorocarbon compound(s) fluid comprises less than about 20 percent by weight of the inflation fluid, more preferably less than about 15 percent by weight, more preferably less than about 10 percent by weight, and still more preferably less than about 5 percent by weight, and the inflation fluid preferably also comprises at least one nonperfluorocarbon gas, preferably nitrogen, argon, or a mixture of nitrogen and argon. Preferably, the fluid comprises at least one perfluorocarbon gas selected from the group consisting of perfluoromethane, perfluoroethane, perfluoropropane, and perfluorobutane, each of which has a boiling point less than about zero degrees C. In one embodiment, the fluid preferably further comprises at least one perfluorocarbon having a boiling point greater than zero degrees C., such as perfluoro-n-pentane or perfluoro-n-hexane. In another embodiment, the fluid further comprises at least one non-perfluorocarbon gas selected from the group comprising gaseous hydrofluorocarbons, gaseous chlorflurohydrocarbons, nitrogen, carbon dioxide, nitrous oxide, helium, argon and xenon. Preferably, the fluid comprises less than about one percent oxygen by volume. In addition, it is preferred that the fluid further comprises at least one anti-oxidant other than a perfluorocarbon. Based on the centrifugal forces associated with rotating tires (worse case due to heat), the low percent perfluorocarbon antioxidant would be in contact with the inner tire surface and thus protect the liner and tire rubber from oxidation. In addition, while at rest, the heavier antioxidant gas will settle to the contact surface which is a high stress point on the liner and tire.

Thus, in one aspect, the present invention provides an inflatable article inflated with a fluid comprising at least one perfluorocarbon compound selected from the group consisting of perfluoromethane, perfluoroethane, perfluoropropane, and perfluorobutane, wherein the total amount of the perfluorocarbon compound fluid comprises less than about 20 percent by weight of the inflation fluid; and wherein the inflation fluid also comprises at least one nonperfluorocarbon gas selected from the group comprising nitrogen and argon. Preferably, the total amount of the perfluorocarbon compound fluid comprises less than about 10 percent by weight of the inflation fluid, and the at least one nonperfluorocarbon gas comprises at least 90 percent by weight of the inflation fluid. More preferably, the total amount of the perfluorocarbon compound fluid comprises less than about 5 percent by weight of the inflation fluid, and the at least one nonperfluorocarbon gas comprises at least 95 percent by weight of the inflation fluid.

In another aspect, the present invention provides a process for inflating an inflatable article such as a vehicle tire. The process comprises inflating the inflatable article with a fluid comprising at least one perfluorocarbon compound, and then sealing the article to prevent escape of the fluid. Preferably, in this process, the fluid comprises at least one perfluorocarbon gas selected from the group consisting of perfluoromethane, perfluoroethane, perfluoropropane, and perfluorobutane. In one embodiment of this process, the fluid preferably further comprises at least one perfluorocarbon having a boiling point greater than zero degrees C. In another embodiment of this process, the fluid further comprises at least one non-perfluorocarbon gas selected from the group comprising gaseous hydrofluorocarbons, gaseous chlorflurohydrocarbons, nitrogen, carbon dioxide, nitrous oxide, helium, argon and xenon. Preferably, the fluid comprises less than about one percent oxygen by volume. Preferably, the fluid further comprises at least one anti-oxidant.

In yet another aspect, the present invention provides a process for operating a pneumatic device. This process comprises supplying a gas comprising at least one perfluorocarbon compound to the pneumatic device as a working fluid, and then applying pressure to the working fluid. Preferably, in this process the working fluid comprises at least one perfluorocarbon gas selected from the group consisting of perfluoromethane, perfluoroethane, perfluoropropane, and perfluorobutane. In one embodiment of this process, the working fluid further comprises at least one perfluorocarbon having a boiling point greater than zero degrees C. In another embodiment of this process, the fluid further comprises at least one non-perfluorocarbon gas selected from the group comprising gaseous hydrofluorocarbons, gaseous chlorflurohydrocarbons, nitrogen, carbon dioxide, nitrous oxide, helium, argon and xenon.

In a further aspect, the present invention provides a process for operating a hydraulic device. This process comprises supplying a liquid comprising at least one perfluorocarbon compound to the hydraulic device as a working fluid, and then applying pressure to the working fluid. In one aspect, in the present process the liquid comprises a mixture of at least one perfluorocarbon liquid and at least one non-perfluorocarbon liquid selected from the group comprising liquid hydrofluorocarbons and liquid chlorflurohydrocarbons. Preferably, in the present process, the at least one perfluorocarbon compound is selected from the group consisting of perfluoro-n-hexane, perfluoromethylcylcopentane, perfluoro-1,3-dimethylcyclohexane, perfluorodecalin, perfluoromethyldecalin, and perfluoroperhydrobenzyltetralin.

DETAILED DESCRIPTION

Figure 1:
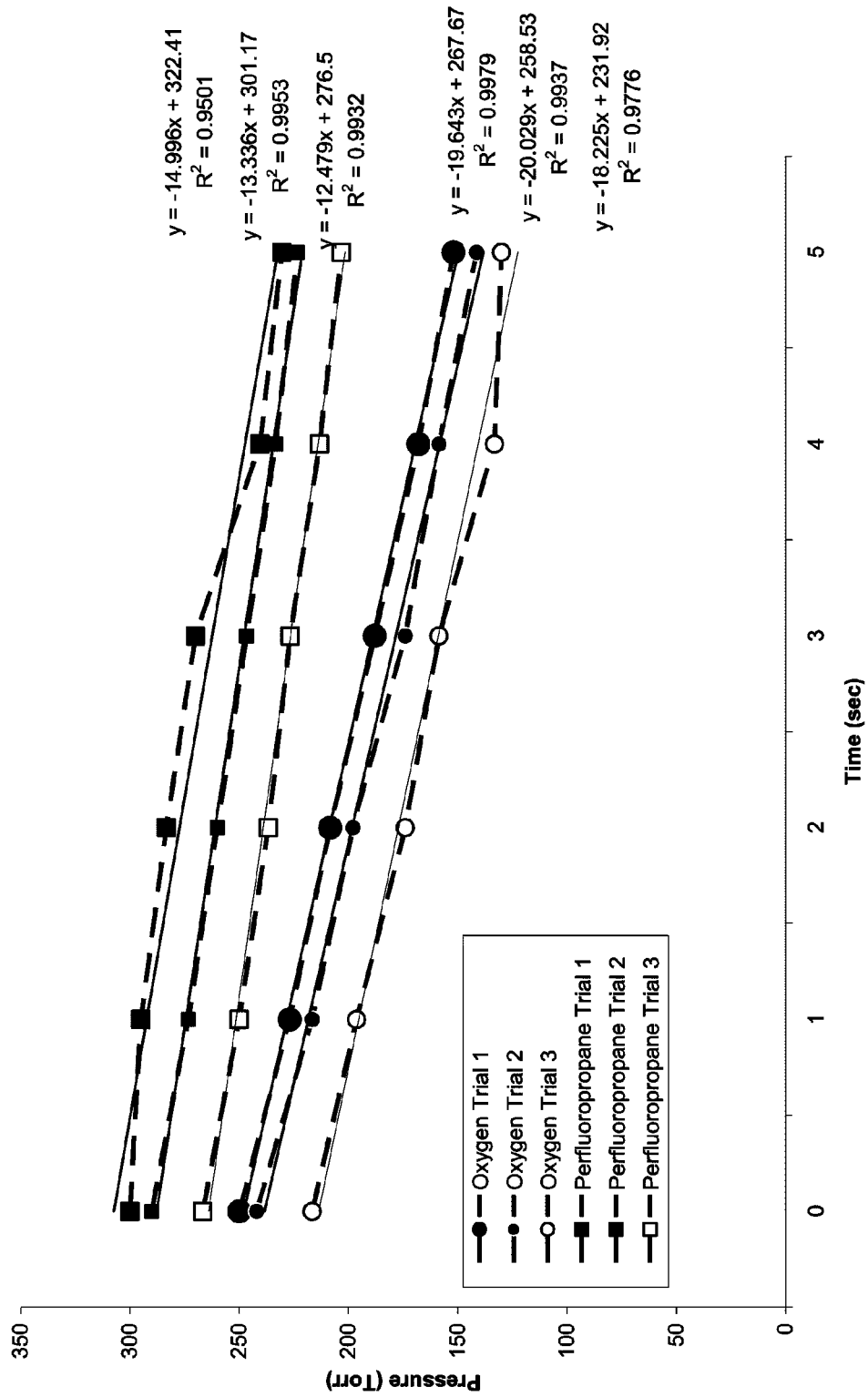
FIG. 1 is a graph showing the reduction of pressure by diffusion of oxygen and perfluoropropane as a function of time, reflecting the lower diffusion rate of perfluoropropane.

Inflating vehicle tires with perfluorocarbon gas according to the present invention, including pure perfluorocarbon gases, predetermined mixtures of perfluorocarbon gases, and predetermined mixtures of one or more perfluorocarbon gases in combination with other inert gases such as nitrogen, allows the tires to retain correct pressure longer while providing improved performance and economy.

The present invention provides for the use of perfluorocarbon gases as for inflation. The process of the present invention provides significant advantages far beyond nitrogen. These inert, high molecular weight, slower diffusion gases have anti-oxidative properties. Perfluorocarbon gases or predetermined mixtures of perfluorocarbon gases with other inert gases such as nitrogen, carbon dioxide, other naturally occurring gases as well as other synthetic gases and additives that promote anti-oxidative processes and limit diffusion, provide more reliable inflation pressure, less leakage, and better thermal properties, thus providing for better tire performance, durability, and economics depending on the specific mix of gases.

As compared to compressed air and pure nitrogen, perfluorocarbon gas and mixtures of perfluorocarbon gas with other gases help to extend tire life by reducing premature failure of the liner and tire. The causes of premature tire failure which are favorably affected by use perfluorocarbon gases to inflate tires include rubber (liner and tire) deterioration by oxidation, tire intracarcass damage, rim corrosion, under-inflation, over-heating, pressure increase due to heat build up, and uneven wear due to improper inflation.

Perfluorocarbon gases can be combined in specific proportions based on their physical properties to produce optimal economic versus high performance, such as, for example, for the inflation of tires for competitive race cars and motorcycles, or for use as a working fluid in specialized pneumatic equipment. In this regard the gas combination can be altered for thermal properties, vapor pressure, diffusivity, density, viscosity, and other physical and chemical properties, depending on the specific application. Additionally, because perfluorocarbons have high solubility coefficients, chemical additives can easily be dissolved in perfluorocarbons to augment their performance, including, but not limited, to chemical anti-oxidants and coating/adhesive molecules to help seal cracks and leaks that do occur or pre-date the use of the perfluorocarbon, reduce the possibility of blowouts, and reduce the effects of blowouts by limiting the acute rate of pressure loss in such situations.

Some relevant physical properties or some perfluorocarbons useful in the processes and articles of the present invention are provided in Table A below.

TABLE A

| Perfluorocarbon | C | F | mp or pour point (deg. C.) | bp (deg. C) | vapor pressure @ 21.1 degrees C. |
|---|---|---|---|---|---|
| perfluoromethane | 1 | 4 | −184 | −128 | |
| perfluoroethane | 2 | 6 | −94 | −78.2 | 30.7 bar |
| perfluoropropane | 3 | 8 | −183 | −37 | 7.92 bar |
| perfluorobutane | 4 | 10 | −128.2 | −2 | 2.9 bar |
| perfluoro-n-pentane | 5 | 12 | −120 | 29 | |
| perfluoro-n-hexane | 6 | 14 | −90 | 58 | 0.283 bar |
| perfluoromethyl-cyclopentane | 6 | 12 | −70 | 48 | 0.368 bar |
| perfluoro-1,3-dimethylcyclohexane | 8 | 16 | −70 | 102 | 48 mbar |
| perfluorodecalin | 10 | 18 | −8 | 142 | 8.8 mbar |
| perfluoromethyldecalin | 11 | 20 | −70 | 155 | 2.9 mbar |
| perfluoroperhydro-benzyltetralin | 17 | 30 | −10 | 260 | <1 mbar |

Literature studies show that oxidative aging is one of the primary causes of limited tire life. Oxidative aging is caused by the diffusion of air, which is 21% oxygen, from the pressurized air cavity of the tire through the tire wall to the outside atmosphere. Tests have shown that if tires are inflated with nitrogen, there is a significant reduction in tire failure. Thus, the use of a perfluorocarbon gas, with no oxygen present, and having specific anti-oxidative properties, provides for an increased reduction in tire failure and loss of inflation pressure in tires and other inflated articles, as well as reduced loss of operating fluid in pneumatically operated devices.

Tires are a significant cost in operating a fleet of vehicles, as well as, with respect to running a competitive race car team. Tire costs include procurement, maintenance and the cost of blowouts. A typical truck tire with two retreads costs $480.00 and lasts approximately 270,000 miles. Inflating tires with perfluorocarbon gases helps to prevent premature casing failure and allow tires to be retread multiple times, with confidence and reliability. Inflating tires with perfluorocarbon to eliminate and prevent oxidative aging may extend tire life by up to 50%. Increasing tire life to 500,000 miles would thus save $300 per truck tire. A fleet with 50 trucks and 900 wheel positions would save over $500,000 in tire cost by inflating with perfluorocarbon gas. The primary cost of maintaining tires is the cost of labor to check tire pressures and top off tires with compressed air on a periodic basis. Tire pressure must be checked and the tires topped off due to the diffusion of air through the tire, a condition that would not exist with perfluorocarbon gas inflation. In addition, tires filled with perfluorocarbon maintain pressure for a much longer period of time than tires filled with air. If a truck fleet conducts preventative maintenance on 5 trucks per day and presently spends 30 minutes per truck topping off tires, they could realize savings of $60,000 per year based on a labor rate of $50 per hour and 250 work days per year, by inflating tires with perfluorocarbon gases.

An additional advantage of filling tires with perfluorocarbon gases on automobiles and trucks is enhanced safety. Under-inflation of tires due to the diffusion of air through the tire has been identified as a significant cause of tire failures. In fact, the TREAD Act recently passed by the U.S. Congress requires the National Highway and Transportation Safety Agency (NHTSA) to develop an on board warning of low tire pressure in all automobiles.

With respect to car competition, the thermal properties as well as reliable inflation characteristics of perfluorocarbon gases provide a significant competitive advantage with respect to Formula 1 and NASCAR racing.

The process of using inert higher molecular weight perfluorocarbon gas and/or mixtures thereof can potentially extend tire life by up to 40%, improve fuel efficiency by up to 8%, provide more consistent tire pressure, eliminate rim corrosion, and should result in tires operating at lower temperatures. Perfluorocarbon gas mixtures are retained longer than air in vehicle tires.

Vehicle fuel economy can be increased by reducing rolling resistance. Tires that lose inflation tend to have increased rolling resistance. Thus, if a vehicle is to have its tires inflated to 35 psi, the vehicle may have an increase in rolling resistance of approximately 13 percent when the tires become underinflated to 28 psi, thus decreasing vehicle fuel economy.

Perfluorocarbon mixtures can be prepared and optimized for maximum tire performance for competitive racing and specialized pneumatic operations.

Bridgestone states that air inflated tires lost an average of 2.7 psi per month and nitrogen inflated tires lost an average of 0.7 psi per month. Due to the increased molecular weight, lower diffusivity, and anti-oxidative properties of perfluorocarbon gases, use of perfluorocarbon gas is estimated to reduce loss to less than 0.1 psi per month. In a Michelin Technical Bulletin, November 2003, Goodyear stated that 15% under-inflation resulted in 8% less tread mileage and 2.5% decrease in fuel economy. The use of perfluorocarbon gas greatly improves these statistics with respect to tread mileage and fuel economy.

The use of perfluorocarbon gas insufflation has commercial application in automobiles, trucks, race cars, motorcycles, military vehicles, airplanes, off road construction vehicles, inflatable boats, and specialized pneumatic equipment, including essentially any and all pneumatic and/or inflatable devices that require consistent pressure, compressibility characteristics and/or specific thermal ranges as a function of their performance.

Thus, the present invention provides an inflatable article such as a vehicle tire inflated with a fluid comprising at least one perfluorocarbon compound. Vehicle tires according to the present invention include tires for automobiles, truck and aircraft. Preferably, the fluid comprises at least one perfluorocarbon gas selected from the group consisting of perfluoromethane, perfluoroethane, perfluoropropane, and perfluorobutane, all of which are gases above zero degrees C. The specific perfluorocarbon selected depends upon the environment in which the inflated article is to be employed. Thus, if the article is to be employed under low temperature conditions, perfluorocarbons having a relatively low boiling point, such as perfluoromethane, perfluoroethane, and perfluoropropane, are preferred so that there will be no condensation of the perfluorocarbon under the low temperature conditions. Thus, in some embodiments of the present invention, it is preferred that the at least one perfluorocarbon have a boiling point greater than zero degrees C.

Table B below provides the mass ratio effect of gases including some fluorocarbons which can be used in the present invention.

TABLE B

| Gas | Molecular Weight | Mass Ratio Effect |
|---|---|---|
| nitrogen | 28 | 1.0 |
| oxygen | 32 | 1.2 |

TABLE B-continued

| Gas | Molecular Weight | Mass Ratio Effect |
|---|---|---|
| air | 29.5 | 1.1 |
| perfluoropropane | 188 | 6.7 |
| perfluorobutane | 238 | 8.5 |
| perfluoropentane | 288 | 10.3 |
| perfluorohexane | 338 | 12.1 |

In other embodiments of the present invention, it is preferred that the fluid comprise at least one non-perfluorocarbon gas selected from the group comprising gaseous hydrofluorocarbons, gaseous chlorflurohydrocarbons, nitrogen, carbon dioxide, nitrous oxide, helium, argon and xenon. Examples of hydrofluorocarbons that can be employed in the fluid of the present invention include highly fluorinated fluorocarbons such as trifluoromethane (HFC-23), pentafluoroethane (HFC-125), trifluoroethane (HFC-143a), and hexafluoropropane (HFC-236a).

In applications in which the article is oxidatively degradable, such as in natural or synthetic rubber vehicle tires, it is preferred that the fluid comprises less than about five percent oxygen by volume, more preferably less than about one percent oxygen by volume, and still more preferably less than about one-tenth of one percent oxygen by volume. In such applications, it is also preferred that the fluid comprise at least one anti-oxidant.

In some applications, such as emergency tire repair applications, it is preferred that the fluid further comprising at least one sealant compound. Examples of sealant compounds that can be employed in the process and articles of the present invention include polymeric acrylate resins, polyvinyl acetates, petroleum residual resins, propylene-ethylene copolymer resins, phenolic resins, glycerol esters of hydrogenated rosins, deproteinated natural rubber latex, terpene resins, and hydrocarbon resins.

In another aspect, the present invention provides a process for inflating an inflatable article such as a vehicle tire. This process comprises inflating the inflatable article with a fluid comprising at least one perfluorocarbon compound, and then sealing the article to prevent escape of the fluid. Preferably, in this process, the fluid comprises at least one perfluorocarbon gas selected from the group consisting of perfluoromethane, perfluoroethane, perfluoropropane, and perfluorobutane, which are all in the gaseous state at temperatures above zero degrees C. Depending on the specific application, the fluid further comprises at least one perfluorocarbon having a boiling point greater than zero degrees C. In addition, or in the alternative, the fluid can further comprise at least one non-perfluorocarbon gas selected from the group comprising gaseous hydrofluorocarbons, gaseous chlorflurohydrocarbons, nitrogen, carbon dioxide, nitrous oxide, helium, argon and xenon. Preferably, the fluid comprises little oxygen, preferably less than about one percent oxygen by volume, and includes at least one anti-oxidant.

Thus, in one embodiment of the present invention, the total amount of the perfluorocarbon compound(s) fluid comprises less than about 20 percent by weight of the inflation fluid, more preferably less than about 15 percent by weight, more preferably less than about 10 percent by weight, and still more preferably less than about 5 percent by weight, and the inflation fluid preferably also comprises at least one nonperfluorocarbon gas, preferably nitrogen, argon, or a mixture of nitrogen and argon.

The present invention also provides a process for operating a pneumatic device. This process comprises supplying a gas comprising at least one perfluorocarbon compound to the pneumatic device as a working fluid, and then applying pressure to the working fluid. Preferably, in this process the working fluid comprises at least one perfluorocarbon gas selected from the group consisting of perfluoromethane, perfluoroethane, perfluoropropane, and perfluorobutane, which are all gases at temperatures above zero degrees C. Depending on the environment in which the process is being carried out, perfluorocarbons having higher boiling points, such as perfluoro-n-pentane, can also be used. In one embodiment of this process, the working fluid further comprises at least one perfluorocarbon having a boiling point greater than zero degrees C., such as perfluoro-n-pentane. In another embodiment of this process, the fluid further comprises at least one non-perfluorocarbon gas selected from the group comprising gaseous hydrofluorocarbons, gaseous chlorflurohydrocarbons, nitrogen, carbon dioxide, nitrous oxide, helium, argon and xenon.

In a further aspect, the present invention provides a process for operating a hydraulic device. This process comprises supplying a liquid comprising at least one perfluorocarbon compound to the hydraulic device as a working fluid, and then applying pressure to the working fluid. In one aspect, in the present process the liquid comprises a mixture of at least one perfluorocarbon liquid and at least one non-perfluorocarbon liquid selected from the group comprising liquid hydrofluorocarbons and liquid chlorflurohydrocarbons. Preferably, in the present process, the at least one perfluorocarbon compound is selected from the group consisting of perfluoro-n-hexane, perfluoromethylcylcopentane, perfluoro-1,3-dimethylcyclohexane, perfluorodecalin, perfluoromethyldecalin, and perfluoroperhydrobenzyltetralin, all of which are liquids under moderate temperature conditions.

The perfluorocarbon gases presently preferred for use in the articles and processes of the present invention are perfluoropentane ($C_5F_{12}$); perfluoropropane ($C_3F_8$); and perfluorobutane ($C_4F_{10}$). In the articles and processes of the present invention, these gases can be mixed in combination with each other, as well as with other inert gases such as nitrogen and carbon dioxide.

It is known that in general the diffusion rate of gases varies with the square root of the reciprocal of the molecular weight of the gas. Air has an average molecular weight of 30, perfluoropentane an average molecular weight of 288; perfluorobutane an average molecular weight of 238, and perfluoropropane an average molecular weight of 188. Assuming that the diffusion pathway remains constant, the relative diffusion rate of these perfluorocarbon compounds compared to air is as follows: The diffusion of perfluoropentane would be 3.1 times slower than air; perfluorobutane would be 2.8 times slower than air; and perfluoropropane 2.5 times slower than air. Considering that at least a 50% reduction in oxidation can be expected assuming that since no oxygen is present in these inert gases, there would potentially be at least a six-fold reduction in leak rate at atmospheric conditions. In addition, this reduction in diffusion rate would be more favorable at elevated pressure and temperature conditions that most applications require. Finally, these inert gases all have better thermal conductivity, heat capacity, compressibility and viscosity properties relative to air.

Combinations of perfluorocarbons with each other in order to optimize performance like biomedical mixing of perfluorocarbon liquids for physiological benefits has been previously reported in the literature: Jeng et al., *Ped. Res.* 53(1) 81-88, 2003. Thus, perfluorocarbon gases can be combined with less expensive air, nitrogen, carbon dioxide, etc. for economy, functional performance and environmental issues. For example, in one embodiment it may be advantageous to mix perfluorocarbons in the following proportion: 10% air; 50% pentane; 20% butane; and 20% propane. This combination could optimize performance while at the same time not utilize too much of any one gas.

This edge for performance in commercial, industrial and consumer equipment far exceeds the cost differential in gas. For example, although it may cost only $0.75 to fill the tires of a conventional auto with air, even if the cost of filling the tires of an expensive race care is $75 dollars, the increased performance may well justify the additional expense.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

function of time as the gas diffused through a 1 mm thick and 1 sq. meter cross sectional area sheet of medical grade silicone. In theory, the difference in diffusion rates should vary with the square root of the ratio of molecular weights. Since the molecular weights of oxygen and perfluoropropane are 32 and 188 respectively, the difference in rates is predicted to by 0.412586. The results of the experiments are shown in Table C below, and give an experimental ratio of 0.41866, and confirm that perfluoropropane has a significantly lower diffusion rate than oxygen. The data of Table C are plotted in FIG. 1, along with linear regression fits to the data, and the corresponding regression equations.

TABLE C

| | Oxygen | | | Perfluoropropane | | |
|---|---|---|---|---|---|---|
| Pressure (mmHg) | Time (sec) | Pressure Slope | | Pressure (mmHg) | Time (sec) | Pressure Slope |
| Trial #1 | | | | | | |
| 250 | 0 | 19.643 | | 300.06 | 0 | 14.996 |
| 227 | 1 | | | 295.059 | 1 | |
| 208.5 | 2 | | | 283.39 | 2 | |
| 188 | 3 | | | 270.054 | 3 | |
| 168 | 4 | | | 240.48/240.48 | 4 | |
| 152 | 5 | | | 230.5/230.46 | 5 | |
| Trial #2 | | | | | | |
| 242 | 0 | 20.029 | | 290.058 | 0 | 13.336 |
| 216.6 | 1 | | | 273.388 | 1 | |
| 198 | 2 | | | 260.052 | 2 | |
| 174 | 3 | | | 246.716 | 3 | |
| 158.6 | 4 | | | 233.38 | 4 | |
| 141.4 | 5 | | | 223.378 | 5 | |
| Trial #3 | | | | | | |
| 216.6 | 0 | 18.225 | | 266.72 | 0 | 12.479 |
| 196.4 | 1 | | | 250.05 | 1 | |
| 174 | 2 | | | 236.714 | 2 | |
| 158.6 | 3 | | | 226.712 | 3 | |
| 133.2 | 4 | | | 213.376 | 4 | |
| 130.026 | 5 | | | 203.374 | 5 | |
| Average | | 19.299 ± 0.949924 | | | | 13.60367 ± 1.27967 |

Example 1

The pressure stability of oxygen and perfluoropropane in Yokohama Geolander G900 tires fitted to a stock 2003 Subaru Forester were tested by filing a tire to a pressure of 22 psig with oxygen at a temperature of 26 degrees C., and raising the temperature to 70 degrees C. to simulate road conditions. The measured pressure of the oxygen in the tire was 30 psig, an increase of 36 percent. The same tire was subsequently filled with perfluoropropane to a pressure of 21 psig at a temperature of 25 degrees C., and the temperature was raised to 70 degrees C. The measure pressure of the perfluoropropane filed tire was 24 psig, and increase of 14 percent.

Example 2

The diffusion rates of oxygen and perfluoropropane were measured in triplicate by monitoring the gas pressure as a Example 3

Figure 2:
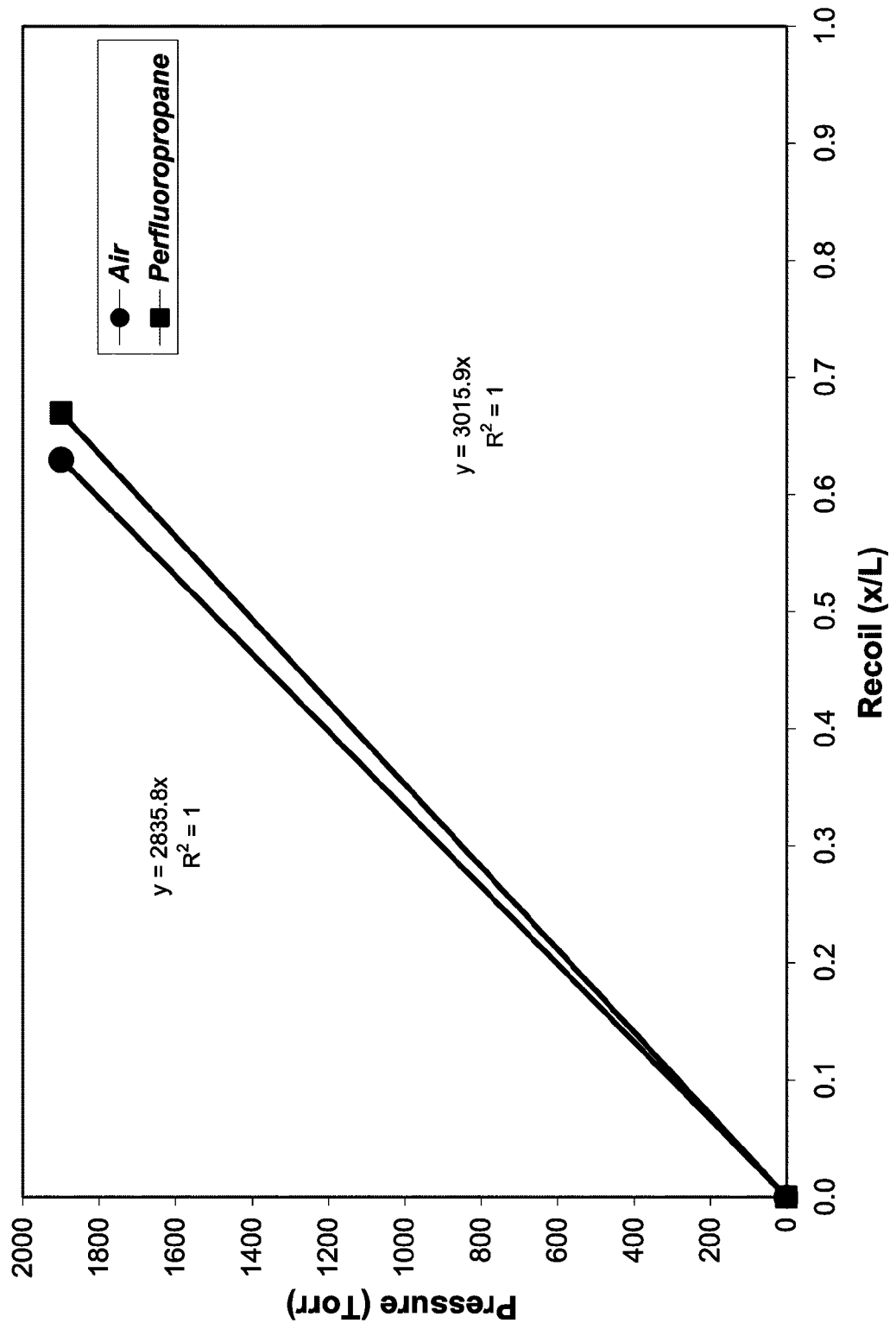
FIG. 2 is a graph is a plot of the recoil of a test ball filled with air or with perfluoropropane, showing that perfluoropropane provides a greater elastic effect than does air.

The elasticity of oxygen and perfluoropropane were measured as follows. A Hedstrom rubber kick ball was filled with gas to a pressure of 2.5 psi (1900 torr). The ball was dropped from a height of ten feet and the maximum height to which the ball initially bounced was measure. The recoil of the ball was taken as the bounce height divided by 10. When the ball was filled with air, the recoil was 0.63. When the ball was filled with perfluoropropane, the recoil was 0.67. The results of the experiment are shown in FIG. 2, along with linear regression fits to the data, and confirm that perfluoropropane has a higher elasticity response than oxygen.

Example 4

A vehicle tire was inflated with nitrogen to a pressure of 30 psi, and emptied. The tire was reinflated with nitrogen to a pressure of 30 psi, and emptied. After this nitrogen purge, the tire was inflated with perfluoropropane to a pressure 22.5 psi. After waiting ten minutes to permit temperature equilibration, inflation was continued with nitrogen to a pressure of 30 psi, to provide a gas mixture of 75 percent perfluoropropane.

The inflation process can be repeated to provide a desired proportion of the perfluoropropane as shown in Table D below:

TABLE D

| Desired perfluoropropane proportion | Tire pressure (psi) | | | | |
|---|---|---|---|---|---|
| | 20 | 30 | 40 | 50 | 60 |
| | Perfluoropropane (psi) | | | | |
| 25% | 5.00 | 7.50 | 10.00 | 12.50 | 15.00 |
| 50% | 10.00 | 15.00 | 20.00 | 25.00 | 30.00 |
| 75% | 15.00 | 22.50 | 30.00 | 37.50 | 45.00 |
| 100% | 20.00 | 30.00 | 40.00 | 50.00 | 60.00 |

Example 5

The retention of various gases within a tire under severe road conditions was tested as follows: Two tires (Yokohama Geolander G900 tires fitted to a stock 2003 Subaru Forester), one front and one rear were filled to 26 psig with either a mixture of 25% air and 75% carbon dioxide or a mixture of 75% perfluoropropane and 25% air. After eight weeks of average use in the Tucson, Ariz. area, where yearly temperatures range from about 35 degrees F. to about 120 degrees F., the tire pressures were measured, and the results are reported in Table E below. The air/carbon dioxide filled tires were topped off to 26 psig with air, as tire pressure gradually dropped, to return to 26 psi at various intervals (see table below). No additional air or PFC was added to the PFC/air filled tires until a later phase of testing when all tires were topped off to 32 psi for further study. After the first eight weeks of use, the tire pressures were measured again. The air/carbon dioxide tires were then again filed to 26 psig with air. After another 32 weeks of use, the tire pressures were measured again. The results reported in Table E show that the perfluoropropane/air mixture is better retained within the tires than the air/carbon dioxide mixture under actual driving conditions.

TABLE E

| | Tire Pressure (psi) | | | |
|---|---|---|---|---|
| Month | Left Front Tire | Left Rear Tire | Right Front Tire | Right Rear Tire |
| 0 | 26 | 26 | 26 | 26 |
| 8 | 28 | 28 | 5 | 5 |
| 16 | 25 | 25 | 15 | 15 |
| 48 | 30 | 30 | 20 | 20 |

Various modifications can be made in the details of the various embodiments of the processes and articles of the present invention, all within the scope and spirit of the invention and defined by the appended claims.

The invention claimed is:

1. An inflatable article inflated with a fluid comprising at least one perfluorocarbon compound selected from the group consisting of perfluoromethane, perfluoroethane, perfluoropropane, and perfluorobutane, wherein the total amount of the perfluorocarbon compound fluid comprises less than about 20 percent by weight of the inflation fluid; the inflation fluid also comprising at least one nonperfluorocarbon gas selected from the group consisting of nitrogen and argon.

2. A process for inflating an inflatable article, the process comprising inflating the inflatable article with an inflation fluid comprising at least one perfluorocarbon compound selected from the group consisting of perfluoromethane, perfluoroethane, perfluoropropane, and perfluorobutane, wherein the total amount of the perfluorocarbon compound fluid comprises less than about 20 percent by weight of the inflation fluid; the inflation fluid also comprising at least one nonperfluorocarbon gas selected from the group consisting of nitrogen and argon, and sealing the article to prevent escape of the fluid.

3. A process according to claim 2 wherein the fluid further comprises at least one non-perfluorocarbon gas selected from the group comprising gaseous hydrofluorocarbons, gaseous chlorflurohydrocarbons, nitrogen, carbon dioxide, nitrous oxide, helium, argon and xenon.

4. A process according to claim 2 wherein the fluid comprises less than about one percent oxygen by volume.

5. A process according to claim 2 wherein the fluid further comprises at least one anti-oxidant.

6. A process according to claim 2 wherein the inflatable article comprises a vehicle tire.

7. An inflatable article according to claim 1 further comprising a vehicle tire.

8. An inflatable article according to claim 1, wherein the total amount of the perfluorocarbon compound fluid comprises less than about 10 percent by weight of the inflation fluid, and the at least one nonperfluorocarbon gas comprises at least 90 percent by weight of the inflation fluid.

9. An inflatable article according to claim 1, wherein the total amount of the perfluorocarbon compound fluid comprises less than about 5 percent by weight of the inflation fluid, and the at least one nonperfluorocarbon gas comprises at least 95 percent by weight of the inflation fluid.

10. An inflatable article according to claim 1 wherein the fluid comprises less than about one percent oxygen by volume.

11. An inflatable article according to claim 1 the fluid further comprising at least one anti-oxidant other than a perfluorocarbon compound.

* * * * *